United States Patent [19]

Block

[11] Patent Number: 4,474,667

[45] Date of Patent: * Oct. 2, 1984

[54] FLUID LOSS CONTROL SYSTEM

[75] Inventor: Jacob Block, Rockville, Md.

[73] Assignee: W. R. Grace & Co., New York, N.Y.

[*] Notice: The portion of the term of this patent subsequent to Dec. 14, 1999 has been disclaimed.

[21] Appl. No.: 446,998

[22] Filed: Dec. 6, 1982

Related U.S. Application Data

[63] Continuation-in-part of Ser. No. 239,073, Feb. 27, 1981, Pat. No. 4,363,736, which is a continuation-in-part of Ser. No. 159,007, Jun. 13, 1980, abandoned.

[51] Int. Cl.$^3$ .............................................. C09K 7/02
[52] U.S. Cl. ............................ 252/8.5 A; 252/8.5 C; 252/8.5 P
[58] Field of Search ............. 252/8.5 A, 8.5 B, 8.5 C; 536/88

[56] References Cited

U.S. PATENT DOCUMENTS

| | | | |
|---|---|---|---|
| 3,072,635 | 1/1963 | Menkart et al. | 536/85 |
| 3,319,715 | 5/1967 | Parks | 252/8.55 X |
| 3,475,334 | 10/1969 | Boudreaux | 252/8.55 |
| 3,900,406 | 8/1975 | Clampitt et al. | 252/8.5 X |
| 4,363,736 | 12/1982 | Block | 252/8.5 |

OTHER PUBLICATIONS

Rogers, *Composition and Properties of Oil Well Drilling Fluids,* Third Edition, pub. 1963, pp. 426–430.

*Primary Examiner*—Herbert B. Guynn
*Attorney, Agent, or Firm*—Howard J. Troffkin

[57] ABSTRACT

A composition capable of imparting fluid loss control properties to aqueous systems. The composition is an admixture of:

(a) a solid particulate material having a particle size distribution wherein at least about 90% of said material is capable of passing through a No. 20 U.S. Standard (Fine Series) Sieve; and (b) a cross-linked hydroxyalkyl cellulose;

wherein the amount of component (a) to component (b) is in the weight ratio of at least about 0.5.

The invention is further directed to improved drilling fluids containing said composition and to the process of drilling bore holes using said improved fluid.

22 Claims, No Drawings

FLUID LOSS CONTROL SYSTEM

This present application is a continuation-in-part application of U.S. application Ser. No. 239,073, filed Feb. 27, 1981 now U.S. Pat. No. 4,363,736 which, in turn, is a continuation-in-part of U.S. application Ser. No. 159,007 filed June 13, 1980, now abandoned.

BACKGROUND OF THE INVENTION

The present invention relates to a composition which is capable of imparting fluid loss controlling properties to aqueous systems. More particularly, the present invention relates to a composition of a solid particulate material and a cross-linked hydroxyalkyl cellulose, to the formation of a water-based drilling fluid containing the subject composition and to an improved method of drilling bore holes into subterranean formations using said drilling fluid.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and the well wall. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to inhibit the amount of fluid, normally water, which is lost into the porous strata through which the bore hole traverses. The loss of fluid causes the formation and build-up of a cake deposit which, after a period of time, can cause sticking of the drill pipe and stoppage of the drilling operation. The drilling fluid must, therefore, be of a nature which permits minimum loss into the porous strata. Agents which impart such property are conventionally termed "water loss controllers" or "fluid loss controllers". These terms are used interchangeably in this disclosure.

The drilling fluid must also be capable of exhibiting the above-described fluid loss properties under changing composition and environmental conditions encountered during the drilling operation. The drilling fluid components should be substantially stable to the presence of various calcium compounds and to sodium chloride which may be present in the fluid from the soil strata with which it is in contact and/or due to the use of salt water having calcium or sodium salts therein used in forming the drilling fluid.

It is desired that drilling fluid components be stable and functional at elevated temperature. It is well known that as the bore hole increases in depth the temperatures encountered are substantially above that found at the earth's surface. Further, heat is generated by frictional forces on the drill bit. It is, therefore, desired that components used in forming drilling fluids be stable with respect to varying elevated temperature conditions.

The viscosity imparted to drilling fluids such as by xanthum gums, Wyoming bentonite clay, etc. has been relied upon as a mode of aiding in fluid loss control with little success especially when drilling into and through porous substrates. In attempts to enhance the control properties of such viscosifiers, various agents have been added. For example, in U.S. Pat. No. 3,032,498 a cyanoethylated starch was described as a water loss controller when used in combination with a clay based mud. U.S. Pat. No. 3,988,246 describes an esterfied or etherified starch as a water loss controlling agent which is compatible with a xanthan gum based drilling mud. Other starches have been employed in clay free muds under limiting temperature conditions as starches are known to be temperature sensitive.

There is a general need for a composition which is capable of imparting fluid loss controlling properties to aqueous compositions such as drilling fluid compositions. The composition should be stable to varying conditions and temperatures commonly encountered in drilling operations and must be easily produced at low cost to aid in the economics of drilling operations.

SUMMARY OF THE INVENTION

The present invention is directed to a composition capable of imparting fluid loss control to alkaline aqueous systems. The composition is an admixture of:

(a) a solid particulate material having a particle size distribution wherein at least about 90% of said material is capable of passing through a No. 20 U.S. Standard (Fine Series) Sieve; and (b) a reaction product formed between a hydroxyalkyl cellulose and a cross-linking agent, the cross-linking agent present at a concentration equivalent to at least about 0.1 percent of stoichiometry with respect to the hydroxyl groups present in the hydroxyalkyl cellulose. Components (a) and (b) are present in a weight ratio of at least about 0.5.

DETAILED DESCRIPTION OF THE INVENTION

The present invention is directed to a composition which is capable of imparting a high degree of fluid (commonly, water) loss controlling properties to aqueous systems; to the use of such compositions to form an improved water based drilling fluid; and to drilling of bore holes into subterranean formations using said improved drilling fluid.

The subject composition is a combination of a solid, particulate material and a cross-linked hydroxyalkyl cellulose. The subject composition shall be described in terms of its use as a component of a drilling fluid.

The solid, particulate material found useful in the subject composition must be substantially insoluble with respect to the fluid medium. Where the fluid is water or an aqueous solution, the solid, particulate material must be substantially insoluble with respect to water. Where the water-based drilling fluid contains oil as part of the fluid medium, either from the earth formation being drilled into or by deliberate addition to the drilling fluid, the solid, particulate material must be substantially insoluble to both the water and oil present. The term "solid" as used in the subject application and claims defines a material which is substantially insoluble in the fluid medium.

The solid, particulate material found useful in the subject composition must be particulate material such that at least about 90% by weight is capable of passing through a No. 20 U.S. Standard Sieve. It is preferred that the major portion of the material be smaller than No. 20 and larger than No. 325 mesh U.S. Standard Sieve Size. Material of the same or similar composition can also be present which are of smaller and/or larger particle size.

The solid, particulate material can be of any composition which is substantially chemically inert with respect to the components such as viscosifiers, thinners, lost-circulation agents and the like which are contained in the drilling fluid composition.

The solid, particulate material can be in the form of a siliceous material, such as sand, quartz, cristobalite, and the like; argillaceous material, such as kaolin, attapulgite, sepiolite, bentonite or other material containing kaolinite, halloysite, montmorillonite or illite minerals or mixtures thereof and the like; shales such as Glen Rose, Glen Davis, Barek, Nova Scotia and the like; limestones such as limestone dolomitic, magnesium limestone, siliceous limestone and the like; sandstones such as siliceous, ferruginous, calcareous, and argillaceous sandstones; minerals such as mica, asbestos, talc, barite, ilmenite, grundite and vermiculite; synthetic and natural zeolites; and precipitated metal silicates such as calcium silicate and aluminum polysilicates. The material can be of natural sources or can be preformed and incorporated into the drilling fluid.

The preferred inert solid, particulate material to be used in forming the present composition are argillaceous materials such as bentonite and attapulgite; silicate minerals such as sepiolite; and shales such as Glen Rose Shale.

The hydroxyalkyl cellulose reaction product found useful in forming the subject inventive composition is formed by contacting a hydroxyalkyl cellulose with an agent capable of cross-linking the cellulose by reacting with the hydroxy groups therein. The hydroxyalkyl cellulose can have a $C_1$-$C_3$ alkyl group and, therefore, be hydroxymethyl, hydroxyethyl, hydroxy-n-propyl or hydroxyisopropyl cellulose. These materials are commercially available. The preferred material is hydroxyethyl cellulose. It is well known that unmodified cellulose chains are composed of repeating anhydroglucose rings, each of which has three hydroxy groups. To form hydroxyethyl cellulose, for example, the cellulose is conventionally treated with an alkali metal hydroxide and then reacted with ethylene oxide by known manners. The hydroxyalkyl cellulose can have a weight average molecular weight of at least about 20,000 and preferably at least about 60,000 with from 60,000 to 150,000 being most preferred.

The cross-linked hydroxyalkyl cellulose suitable in the present invention can be formed by contacting, in a reaction medium, hydroxyalkyl cellulose with a cross-linking agent which are known to be capable of reacting with the hydroxyl units of the cellulose. The preferred agents are selected from an aldehyde or aldehyde generating agent or an epihalohydrin. Suitable aldehyde containing reactants are known organic chemical compounds which contain at least one aldehyde group capable of reacting with hydroxy groups and include, for example, formaldehyde, acetaldehyde, propionaldehyde, glycolaldehyde, glycoxylic acid and the like or polyaldehydes i.e. organic compounds having more than one aldehyde group therein such as glyoxal, paraformaldehyde and the like. Preferred aldehyde reactants are formaldehyde and paraformaldehyde. Suitable aldehyde generating agents are agents which are capable of generating an aldehyde moiety in the reaction medium and include, for example, melamine-formaldehyde monomeric products and derivatives such as tri and hexa(methylol) melamine and the tri and hexa($C_1$-$C_3$ alkoxymethyl) melamine. Such materials can be formed by known conventional methods. The alkyl blocked derivatives are commercially available, are stable to self polymerization and are, therefore, preferred.

The cross-linking agent found suitable in forming the subject cross-linked hydroxyalkyl cellulose component can be an epihalohydrin. The halo group can be chlorine, bromine and the like with chlorine being preferred. Further, the epihalohydrin can be substituted with a $C_1$-$C_3$ alkyl group such as methyl, ethyl, or propyl. The most preferred epihalohydrin cross-linking agent is epichlorohydrin due to its availability and to the superior product formed.

The subject cross-linked hydroxyalkyl cellulose can be formed by reacting a hydroxyalkyl cellulose, as described above, with from about 0.1 to about 200 and preferably from about 1 to 200 and most preferably 1 to 50 percent of stoichiometry of a cross-linking reactant. The stoichiometry is based on three hydroxy groups per anhydroglucose ring of the cellulose chain. Smaller amounts of the cross-linking reactant may be used. The exact amount required depends on the particular materials used and can readily be determined for a particular reactant and hydroxyalkyl cellulose in known manners by those skilled in the art. The formed substantially uniformly cross-linked product should not be substantially water soluble but, instead, should be capable of forming small, discrete, swollen gel particles when introduced into aqueous systems.

The formation of the cross-linked hydroxyalkyl cellulose with an aldehyde or aldehyde generating agent is carried out in an acidic medium preferably an aqueous acidic medium which has a pH of 5.5 or less and preferably from 1 to 4.5. The reaction can be carried out at ambient or elevated temperatures, such as from about 50° C. to 100° C. The solid product can be recovered by conventional techniques such as by precipitation by salts or non-solvent such as alcohol, filtration and drying.

The formation of the cross-linked hydroxyalkyl cellulose with an epihalohydrin should be carried out in a basic medium preferably an aqueous medium which has a pH of at least about 9. The reaction can be carried out at ambient or elevated temperatures, such as from about 50° C. to 100° C. The product is recovered by conventional techniques such as by precipitation in a non solvent, filtration, and drying.

The formation of the cross-linked hydroxyalkyl cellulose with other known agents capable of reacting with hydroxy groups to cross-link the cellulose will be reacted in known manners to cause the cross-linking to occur.

Compositions having the combination of the subject solid, particulate agent and the cross-linked hydroxyalkyl cellulose reaction product as described above have unexpectedly been found to exhibit the desired fluid loss control which is unattainable by separate use of the materials.

The presently described cross-linked hydroxyalkyl cellulose reaction products do not, when used without the subject solids, exhibit and impart fluid loss control properties to aqueous systems as described herein above.

Finally, the solid, particulate material found useful herein does not impart fluid control to aqueous systems either at all or to any high degree. For example, shales, limestones and most clays do not impart fluid control to any degree when incorporated into aqueous systems. Some clays, such as Wyoming bentonite, are known to impart a small degree of fluid control, and are, therefore, required to be used at very high dosage levels, to approach effective control. The high degree of fluid loss control of the present composition is generally not even attainable by the use of such clays at high dosage levels and is particularly not attainable at low levels such as found useful in the present composition.

It has been presently unexpectedly found that when the cross-linked hydroxyalkyl cellulose is combined with the solid, particulate agent described above, one unexpectedly attains an exceptionally high degree of fluid loss control not attributable to either component.

The aqueous system which contains the subject composition should have an alkaline pH of at least 8 and preferably from 8 to 12 and more preferably of from 8.3 to 11.5. At these alkaline pH conditions, one attains the desired properties. Adjustment of the pH can be done with any water soluble inorganic base or acid such as alkali metal hydroxide, alkaline earth metal hydroxide or a hydrogen halide acid, sulfuric acid, nitric acid, alkali metal bicarbonate, or carbonate. The aqueous system should be mixed to the extent required to cause the components of the composition to be substantially uniformly distributed therein.

The cross-linked hydroxyalkyl cellulose reaction product can be used in any effective amount which, when combined with the solid, particulate material present, imparts water loss control to the resulting aqueous system. Normally the concentration of the hydroxyalkyl cellulose should be from about 0.3 to 5 percent and preferably from about 0.75 to 2 percent cross-linked hydroxyalkyl cellulose reaction product based on the weight of the water of the treated aqueous system. The concentration most suitable can be readily determined in conventional manners taking into consideration the nature of the cellulosic polymer i.e. molecular weight, hydroxyl content, the cross-linking reactant, etc., as well as the nature and concentration of other materials contained in the aqueous system.

The weight ratio of the solid, particulate material to the cross-linked hydroxyalkyl cellulose product should be from about 0.5:1 to 20:1 with ratios of from about 1:1 to 10:1 being preferred. Aqueous systems of high solid drilling muds will normally contain a ratio of the components at the upper numerical value while conventional muds will be at a lower numerical ratio such as from 0.5:1 to 3:1.

The above-described composition has been unexpectedly found to impart a high degree of fluid loss control to aqueous systems. That is to say that the fluid containing the subject composition is capable of interacting with the adjacent porosity to inhibit loss of the fluid to the porous environment. The fluid loss of the system can be determined in accordance with the American Petroleum Institute's procedure API No. RP-13B. After initial spurt, the desired water loss control attained with the subject composition is of less than about 30 ml per 30 minutes and, preferably, less than about 20 ml/30 min.

It has been further unexpectedly found that the subject composition has excellent stability to temperature, calcium and sodium salts and various other conditions desired of a fluid used in rotary drilling of bore holes and the like. The drilling fluids containing the subject composition have unexpectedly been found to have high degrees of stability with respect to their fluid loss properties under various adverse conditions such as to elevated temperatures for sustained periods of time, to high shear rates such as are encountered at the site of the drill bit, as well as to the presence of various corrosive elements such as calcium chloride, sodium chloride and the like which may be entrained in such fluids.

The drilling fluid composition of the subject invention can contain other conventional drilling fluid additives such as viscosifiers as, for example, calcium hydroxide, xanthan gums; weighting agents as, for example, crushed oyster shells, barite and the like; thinner such as ferrochrome lignosulfonate and the like; lost-circulation agents such as ground walnut shells, cotton seed hulls and the like; pH adjusters such as MgO, sodium carbonate, magnesium carbonate, sodium bicarbonate and the like; as well as other conventional additives.

The term "water-based" or "aqueous" systems which is used herein in describing the present invention, generally includes drilling fluids and the like which have a liquid base comprising substantially fresh water or salt water. However, it is to be realized that at times certain small amounts of other liquids may be emulsified or admixed with the water based fluid. For example, drilling fluids may at times contain small amounts of oil, emulsified or admixed with the drilling fluid, the oil coming either from an oil formation which has been drilled into or, under certain conditions, can be purposely added.

The present water based drilling fluids containing the subject composition described above and having a pH within the range of from about 8 to 12 and preferably 8.3 to 11.5 have been found to be stable to temperature, the presence of calcium and sodium salts and to the presence of conventional drilling fluid additives. Further, the present drilling fluids are substantially non-corrosive and non-destructive to metal equipment commonly used in drilling operations.

The subject composition can be used with conventional bore hole drilling equipment in manners known to those skilled in the art to efficiently and effectively drill bore holes into subterranean formations.

The following examples are given for illustrative purposes only, and are not meant to be a limitation on the subject invention except as indicated by the appended claims. All parts and percentages are by weight unless otherwise indicated.

EXAMPLE I

Formation of Cross-Linked Hydroxyethyl Cellulose

A 5 percent solution of commercially obtained hydroxyethyl cellulose (MS equals 2.5, Brookfield viscosity of 5 percent solution equals 150 centipoise; Natrosol 250-L) was formed. To 200 parts of the 5 percent solution was added 5.1 parts of epichlorohydrin and 4.4 parts sodium hydroxide. The solution was heated to 80° C. and maintained at that temperature for 1 hour with constant agitation. The material was cooled to form the aqueous suspension of cross-linked hydroxyethyl cellulose.

The cross-linked hydroxyethyl cellulose was tested to determine fluid loss properties, if any, the product could impart to aqueous solutions. A portion of the formed aqueous suspension described above was diluted with water to form an aqueous system having 1 percent (HEC basis) of cross-linked hydroxyethyl cellulose therein. The fluid loss control was determined using American Petroleum Institute (API) procedure RP 13B at 100 psi and 25° C. A fluid loss value of greater than 100 ml/30 minutes was obtained. The product did not impart fluid loss control to aqueous systems.

EXAMPLE II

This example illustrates that aqueous systems containing a mixture of a shale as the solid, particulate material and the cross-linked hydroxyethyl cellulose (HEC) of Example I exhibit good fluid loss properties.

The aqueous cross-linked HEC formed in Example I was diluted with water to form a 1 percent concentration (HEC as basis). To 100 parts sample of this aqueous system (containing 1 part HEC cross-linked product) was added 2.85 parts of Glen Rose Shale which was capable of passing through a series of U.S. Standard Sieves such that the particle distribution was 0.7% remained on 40 mesh; 41% on 60 mesh; 10.2% on 100 mesh; 40% on 140 mesh; 2.1% on 200 mesh; and remaining passing through as fines. The sample was mixed to obtain a substantially uniform mixture and tested for fluid loss control (total fluid loss, TFL) according to API procedure RP 13B at 100 psi and 25° C. The sample was then subjected to elevated temperature (250° F.; 121° C.) with constant agitation for a 16 hour period. The sample was then subjected to high shear forces by circulating the material through a capillary tube (I.D.=0.0314 inch) for 30 minutes to give an approximate shear rate of 25,000 sec$^{-1}$. The sample was cooled to ambient temperature and retested according to procedure RP 13B. The results are given in Table I below.

EXAMPLE III

A sample of Glen Rose Shale and cross-linked hydroxyethyl cellulose was prepared according to Example II above except that the shale was added to the sample just prior to testing for fluid loss. The sample was also subjected to elevated temperature of 121° C. with constant agitation for a 16 hour period. The results are given in Table I below.

EXAMPLE IV

A sample was formed according to Example II above, except that 4 parts attapulgite clay was added instead of the shale. The attapulgite clay had a particle size distribution such that when passed through a stack of U.S. Standard Sieves 1.3% remained on 20 mesh screen; 5.7% on 40 mesh; 13.3% on 60 mesh; 21% on 100 mesh; 23.5% on 140 mesh; 9.5% on 200 mesh; and remaining passing through as fines.

The sample was tested before and after being subjected to extended high temperature agitation (121° C./16 hrs). The results are given in Table I below.

EXAMPLE V

A sample was prepared and tested as described in Example II above except that the shale used therein was replaced with 3 parts of sepiolite. Further, instead of tap water, the sample was formed with an artificially prepared seawater according to the formulation disclosed by Brujewicz in *The Oceans* by H. U. Sverdrup et al, Prentice Hall, 1961, page 186. The seawater was prepared by mixing 106 parts NaCl, 20.9 parts MgCl$_2$6H$_2$O, 13.2 parts MgSO$_4$, 6.1 parts CaCl$_2$2H$_2$O, 2.9 parts KCl, 0.8 parts NaHCO$_3$ and 0.3 part NaBr with sufficient water to make 4000 parts sample. The sepiolite used had a particle size distribution such that when passed through a stack of U.S. Standard Sieves, 1% remained on a 20 mesh screen; 5.8% on a 40 mesh; 14.7% on a 60 mesh; 22.1% on a 100 mesh; 18.3% on a 140 mesh; 12.5% on a 200 mesh; and the remainder passing through as fines.

The sample was tested before and after being subjected to extended high temperature agitation (121° C./16 hrs). The results are given in Table I below.

EXAMPLE VI

A sample was formed according to Example II above except that the shale was replaced with 4.8 parts of Wyoming bentonite (dominant exchangeable cation is sodium). The bentonite had a particle size distribution such that when passed through a stack of U.S. Standard Sieves, 0.1% remains on 20 mesh screen; 0.2% on 40 mesh; 0.9% on 60 mesh; 3.1% on 100 mesh; 8% on 140 mesh; 21.4% on 200 mesh; and remainder passing through as fines.

The sample was tested before and after being subjected to extended high temperature agitation (121° C./16 hrs). The results are given in Table I below.

TABLE I

| Example | Condition | TFL(ml/30 min.) | Cake |
|---|---|---|---|
| II | as formed | 5.6 | 1/32 |
|  | 121° C./16 hrs/Shear | 5.6 | 1/32 |
| III | as formed | 2.0 | 1/32 |
|  | 121° C./16 hrs | 2.4 | 1/32 |
| IV | as formed | 8.8 | 1/32 |
|  | 121° C./16 hrs | 14.4 | 1/32 |
| V | as formed | 9.3 | 1/32 |
|  | 121° C./16 hrs | 16.4 | 1/32 |
| VI | as formed | 14.3 | 1/32 |
|  | 121° C./16 hrs | 25.0 | 1/32 |

None of the above samples exhibited a spurt, i.e. an initial exaggerated fluid loss, to any significance.

EXAMPLE VII

For comparative purposes, aqueous mixtures were formed using the same solid, particulate material and aqueous base (D.I. water or sea water) as used above except free of polymer. The samples were formed and tested as described above and results are given in Table II below.

TABLE II

| Sample | Solid | % | TFL |
|---|---|---|---|
| 1 | Glen Rose Shale | 2.85 | >100 |
| 2 | Attapulgite | 4.0 | >100 |
| 3 | Sepiolite | 3.0 | >100 |
| 4 | Na Bentonite | 6.4 | 14.3 |

Each of Samples 1, 2 and 3 exhibited substantially no fluid loss control and, when compared to the results given in Table I above, show the unexpected improvement attained by the present invention. Sample 4 was formed with an amount of sodium bentonite required to attain the same TFL as is attained by the subject composition of Example VI. Comparison of Sample 4 above with Example VI shows that by the present invention one can attain the same TFL using 25 percent less bentonite.

While the invention has been described in connection with certain preferred embodiments, it is not intended to limit the invention to the particular forms set forth but, on the contrary, it is intended to cover such alternatives, modifications and equivalents as defined by the appended claims.

What is claimed is:

1. A composition capable of imparting fluid loss control to aqueous systems, said composition comprising a mixture of:
   (a) a solid, particulate material which is insoluble in the aqueous system and having a particle size wherein at least about 90 percent of said material is capable of passing through a No. 20 U.S. Standard Sieve; and
   (b) a reaction product formed in an aqueous solution of a water soluble hydroxy $C_1$–$C_3$ alkyl cellulose between said hydroxyalkyl cellulose and from at least about 0.1 to 200 percent of stoichiometry based on the hydroxyl groups of the cellulose of an agent capable of cross-linking said cellulose selected from the group consisting of an epihalohydrin, a compound having at least one aldehyde group therein or a compound capable of generating an aldehyde group in situ;

component (a) and (b) being present in a ratio of from about 0.5:1 to about 20:1; the reaction between said hydroxyalkyl cellulose and a compound having or capable of generating at least one aldehyde group therein is carried out in an aqueous acidic medium having a pH of 5.5 or less and the reaction between said hydroxyalkyl cellulose and an epihalohydrin is carried out in an aqueous basic medium having a pH of at least about 9.

2. The composition of claim 1, wherein the component (b) is formed in an aqueous acidic medium from a hydroxyalkyl cellulose and from 1 to 50 percent of stoichiometry of a compound having at least one aldehyde group therein or a compound capable of generating an aldehyde group in situ.

3. The composition of claim 1, wherein the component (b) is formed in an aqueous alkaline media from a hydroxyalkyl cellulose and from 1 to 50 percent of stoichiometry of an epihalohydrin.

4. The composition of claim 2, wherein the solid, particulate material is selected from the group consisting of siliceous material, argillaceous material and shales.

5. The composition of claim 2 wherein the aldehyde containing or generating agent is selected from the group consisting of formaldehyde, acetaldehyde, propionaldehyde, glycolaldehyde, glyoxylic acid, glyoxal, paraformaldehyde, tri(methylol) melamine, hexa(methylol) melamine, tri($C_1$–$C_3$ alkoxymethyl) melamine or hexa ($C_1$–$C_3$ alkoxymethyl) melamine.

6. The composition of claim 3, wherein the solid, particulate material is selected from the group consisting of siliceous material, argillaceous material and shales.

7. The composition of claim 5 wherein the agent is selected from the group consisting of formaldehyde, paraformaldehyde or glyoxal.

8. In a water based drilling fluid suitable for circulating in a bore hole while drilling the bore hole into subterranean formations which include, water, a weighting agent and a fluid-loss controller, the improvement which comprises that said fluid loss controlling agent is the composition of claim 1 present in said fluid in from about 1 to 15 percent by weight based on the weight of the water present in said fluid and said fluid is maintained at a pH of from 8 to 12.

9. In a water based drilling fluid suitable for circulating in a bore hole while drilling the bore hole into subterranean formations which include, water, a weighting agent and a fluid-loss controller, the improvement which comprises that said fluid loss controlling agent is the composition of claim 2 present in said fluid in from about 1 to 15 percent by weight based on the weight of the water present in said fluid and said fluid is maintained at a pH of from 8 to 12.

10. In a water based drilling fluid suitable for circulating in a bore hole while drilling the bore hole into subterranean formations which include, water, a weighting agent and a fluid-loss controller, the improvement which comprises that said fluid loss controlling agent is the composition of claim 3 present in said fluid in from about 1 to 15 percent by weight based on the weight of the water present in said fluid and said fluid is maintained at a pH of from 8 to 12.

11. In a water based drilling fluid suitable for circulating in a bore hole while drilling the bore hole into subterranean formations which include, water, a weighting agent and a fluid-loss controller, the improvement which comprises that said fluid loss controlling agent is the composition of claim 5 present in said fluid in from about 1 to 15 percent by weight based on the weight of the water present in said fluid and said fluid is maintained at a pH of from 8 to 12.

12. In a water based drilling fluid suitable for circulating in a bore hole while drilling the bore hole into subterranean formations which include, water, a weighting agent and a fluid-loss controller, the improvement which comprises that said fluid loss controlling agent is the composition of claim 7 present in said fluid in from about 1 to 15 percent by weight based on the weight of the water present in said fluid and said fluid is maintained at a pH of from 8 to 12.

13. In a process of drilling a bore hole into a subterranean formation using conventional bore hole drilling equipment, the improvement comprising circulating in the bore hole while drilling the drilling fluid of claim 8.

14. In a process of drilling a bore hole into a subterranean formation using conventional bore hole drilling equipment, the improvement comprising circulating in the bore hole while drilling the drilling fluid of claim 9.

15. In a process of drilling a bore hole into a subterranean formation using conventional bore hole drilling equipment, the improvement comprising circulating in the bore hole while drilling the drilling fluid of claim 10.

16. In a process of drilling a bore hole into a subterranean formation using conventional bore hole drilling equipment, the improvement comprising circulating in the bore hole while drilling the drilling fluid of claim 11.

17. In a process of drilling a bore hole into a subterranean formation using conventional bore hole drilling equipment, the improvement comprising circulating in the bore hole while drilling the drilling fluid of claim 12.

18. A method of inhibiting fluid loss from an aqueous drilling fluid in subterranean formations comprising adding the composition of claim 1 to said aqueous drilling fluid in an amount of from about 1 to 15 percent by weight based on the weight of the water present in said drilling fluid and maintaining said system at a pH of from 8 to 12.

19. A method of inhibiting fluid loss from an aqueous drilling fluid in subterranean formations comprising adding the composition of claim 2 to said aqueous drilling fluid in an amount of from about 1 to 15 percent by weight based on the weight of the water present in said drilling fluid and maintaining said system at a pH of from 8 to 12.

20. A method of inhibiting fluid loss from an aqueous drilling fluid in subterranean formations comprising adding the composition of claim 3 to said aqueous drilling fluid in an amount of from about 1 to 15 percent by weight based on the weight of the water present in said drilling fluid and maintaining said system at a pH of from 8 to 12.

21. A method of inhibiting fluid loss from an aqueous drilling fluid in subterranean formations comprising adding the composition of claim 5 to said aqueous drilling fluid in an amount of from about 1 to 15 percent by weight based on the weight of the water present in said drilling fluid and maintaining said system at a pH of from 8 to 12.

22. A method of inhibiting fluid loss from an aqueous drilling fluid in subterranean formations comprising adding the composition of claim 7 to said aqueous drilling fluid in an amount of from about 1 to 15 percent by weight based on the weight of the water present in said drilling fluid and maintaining said system at a pH of from 8 to 12.

* * * * *